(12) United States Patent
Hermann

(10) Patent No.: US 8,481,191 B2
(45) Date of Patent: Jul. 9, 2013

(54) RIGID CELL SEPARATOR FOR MINIMIZING THERMAL RUNAWAY PROPAGATION WITHIN A BATTERY PACK

(71) Applicant: Tesla Motors, Inc., Palo Alto, CA (US)

(72) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/705,433

(22) Filed: Dec. 5, 2012

(65) Prior Publication Data

US 2013/0078494 A1      Mar. 28, 2013

Related U.S. Application Data

(62) Division of application No. 12/545,146, filed on Aug. 21, 2009, now Pat. No. 8,367,239.

(51) Int. Cl.
*H01M 2/02* (2006.01)

(52) U.S. Cl.
USPC ............................................ 429/100; 429/99

(58) Field of Classification Search
USPC .................................................. 429/96–100
See application file for complete search history.

(56) References Cited

U.S. PATENT DOCUMENTS

| 6,586,912 | B1 | 7/2003 | Tsukamoto et al. |
| 7,014,949 | B2 * | 3/2006 | Kanai et al. ................... 429/148 |
| 2006/0164795 | A1 | 7/2006 | Jones et al. |

FOREIGN PATENT DOCUMENTS

WO    PCT/GB93/02326    5/1994

* cited by examiner

*Primary Examiner* — Maria J Laios
(74) *Attorney, Agent, or Firm* — Patent Law Office of David G. Beck

(57) ABSTRACT

A spacer assembly, comprised of a plurality of rigid spacers, is provided that is configured for use with a cell mounting bracket within a battery pack. The spacer assembly maintains the positions of the batteries within the battery pack during a thermal event and after the cell mounting bracket loses structural integrity due to the increased temperature associated with the thermal event. By keeping the battery undergoing thermal runaway in its predetermined location within the battery pack, the minimum spacing between cells is maintained, thereby helping to minimize the thermal effects on adjacent cells while ensuring that the cooling system, if employed, is not compromised. As a result, the risk of thermal runaway propagation is reduced.

8 Claims, 6 Drawing Sheets

RIGID CELL SEPARATOR FOR MINIMIZING THERMAL RUNAWAY PROPAGATION WITHIN A BATTERY PACK

CROSS-REFERENCE TO RELATED APPLICATION

This patent application is a divisional of U.S. patent application Ser. No. 12/545,146, filed 21 Aug. 2009, the disclosure of which is incorporated herein by reference for any and all purposes.

FIELD OF THE INVENTION

The present invention relates generally to batteries, and more particularly, to a means for minimizing the propagation of thermal runaway within a battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, e.g., by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway. Accordingly, what is needed is a means for minimizing thermal runaway propagation, thereby limiting the risks and damage associated with such an event. The present invention provides such a means.

SUMMARY OF THE INVENTION

The present invention provides a spacer assembly for use with a cell mounting bracket in a battery pack. The spacer assembly, comprised of one or more spacers, maintains the positions of the batteries within the battery pack during a thermal event and after the cell mounting bracket loses structural integrity due to the increased temperature associated with the thermal event. By keeping the battery undergoing thermal runaway in its predetermined location within the battery pack, the minimum spacing between cells is maintained, thereby helping to minimize the thermal effects on adjacent cells while ensuring that the cooling system, if employed, is not compromised. As a result, the risk of thermal runaway propagation is reduced.

In at least one embodiment of the invention, a thermal runaway propagation prevention system for use with a plurality of batteries within a battery pack is provided, the system comprised of a cell mounting bracket configured to hold the batteries in predetermined locations and with a predetermined minimum battery-to-battery separation distance, and a spacer assembly for maintaining the batteries within their predetermined locations and for maintaining the minimum battery-to-battery separation distance. The spacer assembly is comprised of a plurality of rigid spacers independent and separate from the cell mounting bracket and configured to fit between adjacent batteries of the plurality of batteries and maintain each of the plurality of batteries within the predetermined location and with the minimum battery-to-battery separation distance. Each of the plurality of rigid spacers has a height dimension of between 1% and 5% of the overall battery height. The spacer assembly is comprised of a ceramic material that is electrically insulating, has a low coefficient of thermal conductivity, and has a higher melting temperature than that of the cell mounting bracket. Preferably the melting temperature of the spacer assembly is greater than 300° C.; alternately, greater than 500° C.; alternately, greater than 800° C.; alternately, greater than 1000° C. The spacer assembly may be comprised of a material selected from the group consisting of aluminum oxide, magnesium oxide, silicon dioxide, silicon nitride, silicon carbide, alumina silicate, aramid paper, silicone coated fiberglass, acrylic coated fiberglass, vermiculite coated fiberglass, graphite coated fiberglass, polytetrafluoroethylene coated fiberglass, or some combination thereof. The plurality of rigid spacers may be friction fit or bonded into place.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figure 1:
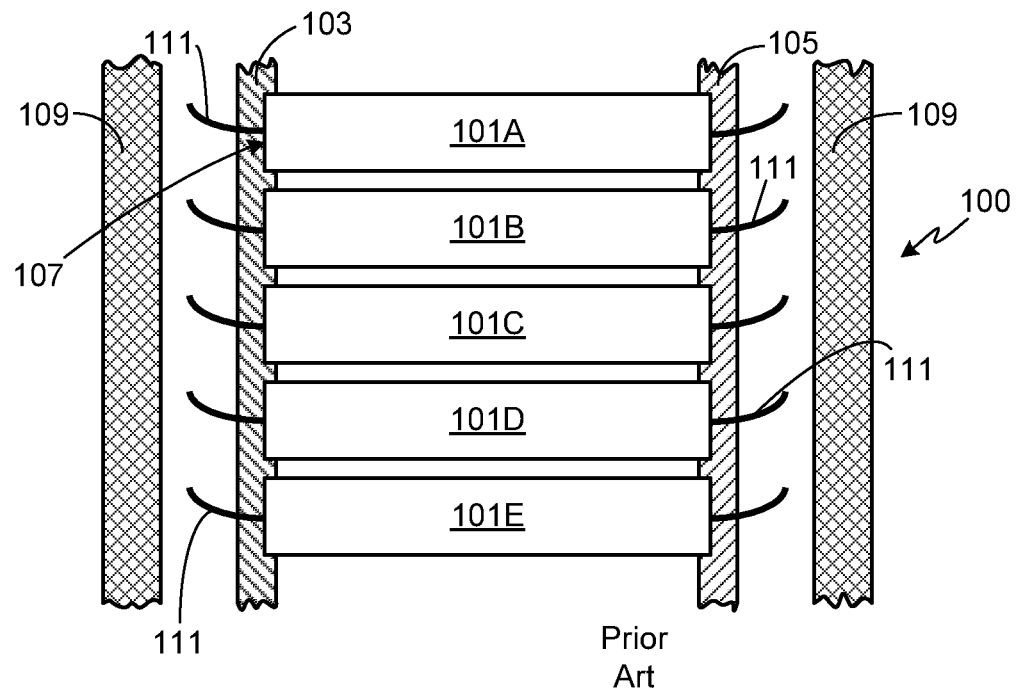
FIG. 1 illustrates the basic components in a conventional battery pack.
Figure 2:
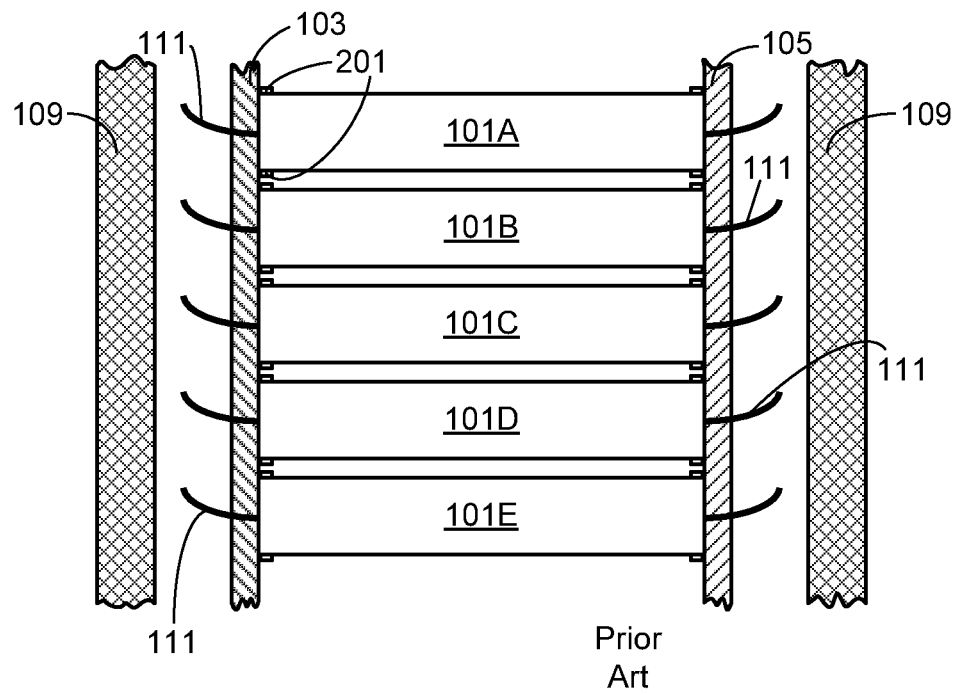
FIG. 2 illustrates an alternate configuration of a conventional battery pack in which the cell mounting brackets include a plurality of locator tabs.

FIG. 1 is a simplified view of a portion of a conventional battery pack 100. Although batteries 101A-101E are shown as having a cylindrical form, for example utilizing the 18650 form-factor, it should be understood that the problems outlined below as well as the solutions offered by the present invention are equally applicable to both cylindrical batteries and those utilizing a different form-factor, e.g., pouch cells, rectangular cells, etc. It will also be appreciated that while FIG. 1 only shows a few cells, i.e., cells 101A-101E, a battery pack may include as few as two cells (e.g., flashlights, laptops, etc.), or as many as thousands of cells (e.g., hybrid and electric vehicles). Typically battery pack 100 uses brackets 103/105 to hold the cells in place, brackets 103/105 constituting the entire battery pack housing, or only an internal component of the housing. Each bracket 103/105 includes means for holding cells 101A-101E within predetermined locations and with a minimum battery-to-battery spacing. It will be appreciated that a conventional battery pack may use any of a variety of means to hold the cells in place. For example, in the embodiment illustrated in FIG. 1, each bracket 103/105 includes a plurality of indentations or apertures 107 that are suitably sized to receive a portion of each cell as shown, indentations/apertures 107 being formed during bracket fabrication via molding, milling or other well-known processes. FIG. 2 shows an alternate configuration in which brackets 103/105 include a plurality of locator tabs 201, locator tabs 201 being used to hold the cells in place. As previously noted, battery pack 100 may include a secondary, external housing 109. Secondary housing 109 may be used to provide further protection to the cells, additional cell isolation, or an improved battery pack mounting structure. Battery pack 100 also includes a connector plate (not shown) or some other means of electrically connecting the individual battery interconnects 111.

In a conventional battery pack, the material selected for cell mounting brackets 103/105 preferably meets several design requirements. First, the selected material should lend itself to easy fabrication techniques, for example injection molding, thus expediting manufacturing while minimizing cost. Second, the brackets should be relatively low mass, a material characteristic that is especially important in large battery packs where overall mass is critical, e.g., hybrid and electrical vehicles. Third, since the cell casing is typically a cell terminal, the material should be electrically non-conductive. Even in those instances in which the cell casing is not a cell terminal, or is covered by a non-conductive material, an electrically non-conductive cell bracket is still preferred in order to minimize the risks of battery shorting, for example during handling. Accordingly, to meet these design requirements, a conventional cell mounting bracket is typically manufactured from a polymer, e.g., a plastic such as nylon.

In a conventional cell, such as a high energy density lithium ion cell, a variety of different abusive operating/charging conditions and/or manufacturing defects may cause the cell to enter into thermal runaway, where the amount of internally generated heat is greater than that which can be effectively withdrawn. During such an event, a large amount of thermal energy is rapidly released, heating the entire cell up to a temperature of 900° C. or more. Due to the increased temperature of the cell undergoing thermal runaway, the temperature of adjacent cells within the battery pack will also increase. If the temperature of these adjacent cells is allowed to increase unimpeded, they may also enter into a state of thermal runaway. Accordingly, it is critical that measures are taken to decrease the likelihood of a single thermal runaway event propagating throughout the battery pack.

One technique that may be used to prevent the thermal runaway of a single cell from propagating throughout the remaining batteries within a battery pack is to limit the thermal transfer between adjacent cells. Since the thermal runaway of a single cell is a relatively rapid event, and given the inefficient transfer of thermal energy via convection through air relative to conduction, one of the simplest approaches to minimizing thermal runaway propagation is by separating the cells within the battery pack. Given the event's short duration, even a small separation distance can dramatically improve the resistance to thermal runaway propagation. Accordingly, it is very important that the cells within a battery pack remain in their designated positions during a thermal runaway event such that conductive heat transfer between cells is minimized.

In a conventional battery pack where the cell mounting brackets, e.g., brackets 103/105, are fabricated from a polymer or similar material, the increased temperature associated with a thermal runaway event may cause the regions of the brackets in close proximity to the cell undergoing thermal runaway to melt or vaporize. As a result, the cell may no longer be held rigidly in position, thus allowing the distance between the affected cell and neighboring cells to differ from the intended spacing. In some applications, for example where the cells are stacked as illustrated in FIGS. 1 and 2, gravitational forces may expedite cell movement once the bracket(s) begins to melt and/or vaporize. As the affected cell moves, the spacing between cells may be diminished, leading to decreased resistance to thermal runaway propagation. Cell movement may also decrease the effectiveness of the battery pack cooling system, assuming one is used, thus further lowering the battery pack's resistance to thermal runaway propagation. Lastly, it should be appreciated that if the affected cell moves sufficiently, it may come to rest against an adjacent cell, thereby changing the heat transfer process from radiation and convection-based, to a combination of radiation, convection and the more thermally efficient process of conduction.

In accordance with the invention, one or more spacers are used within a battery pack to reduce the movement of a cell undergoing thermal runaway and ensure that it remains in position. By keeping the affected cell in position, the minimum spacing between cells is maintained, thereby helping to minimize the thermal effects on adjacent cells while ensuring that the cooling system, if employed, is not compromised. As a result, the risk of thermal runaway propagation can be managed.

Regardless of the configuration used for the spacer(s), it is fabricated from a material, preferably a ceramic, that is capable of withstanding the temperatures associated with thermal runaway without melting, vaporizing or deforming, thus ensuring that the affected cell remains in its intended position for the duration of the thermal event. Exemplary ceramic materials suitable for use with the invention include aluminum oxide (alumina), magnesium oxide (magnesia), silicon dioxide (silica), silicon nitride, silicon carbide (carborundum) and alumina silicate. Other suitable materials include aramid and coated fiberglass, e.g., fiberglass coated with silicone, acrylic, vermiculite, graphite, or polytetrafluoroethylene (PTFE). Preferably the spacer has a melting temperature of at least 300° C., more preferably of at least 500° C., still more preferably of at least 800° C., and yet still more preferably of at least 1000° C. The material used for the spacer(s) depends, in part, on the design of the spacer and the preferred manufacturing techniques for the spacer. The material's selection also depends on how the spacer(s) is intended to interface with the batteries and battery pack components. Preferably the material selected for the spacer(s) has a relatively low mass, thus minimizing its contribution to overall battery pack mass. The selected material should also have a relatively low coefficient of thermal conductivity, thus ensuring that it does not effectively transfer thermal energy from the affected cell to the neighboring cells. Additionally, the selected material should be electrically insulating.

Figure 3:
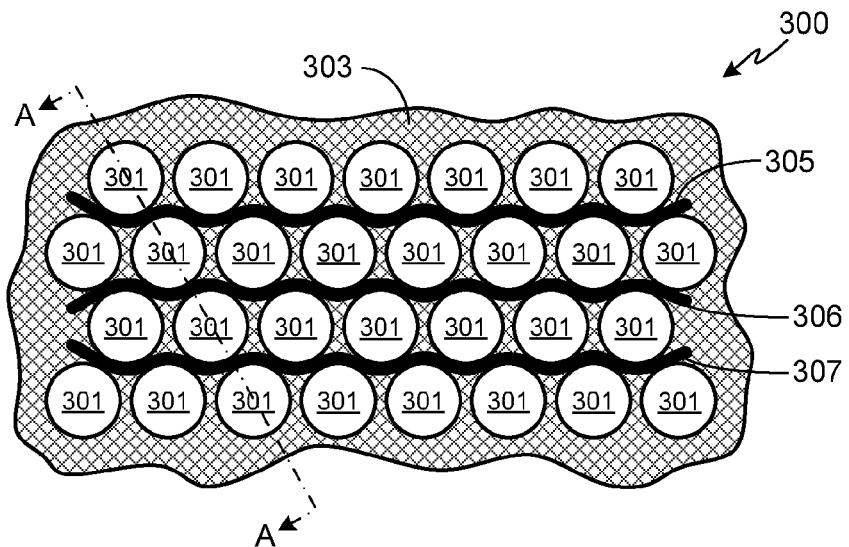
FIG. 3 illustrates an embodiment of the invention using spacer strips.

FIG. 3 provides a top-view of a portion of a battery pack 300. This view shows a plurality of cylindrical cells 301 as well as a lower cell mounting bracket 303. A first high temperature spacer strip 305 is located between the first and second rows of cells 301; a second high temperature spacer strip 306 is located between the second and third rows of cells 301; and a third high temperature spacer strip 307 is located between the third and fourth rows of cells 301. As shown, strips 305-307 are interwoven through the mounted cells. It will be appreciated that battery pack 300 may be comprised of either a fewer or a greater number of cells, and thus may require a different number of high temperature spacers. Additionally, a single high temperature spacer may be continuously interwoven through all of the cells, rather than breaking the spacer into regions as illustrated.

In the embodiment illustrated in FIG. 3, preferably the high temperature spacers, e.g., spacers 305-307, are fabricated from a compressible material. The use of a compressible material ensures that the cells remain in place, even if the cell mounting brackets, e.g., lower bracket 303, melts or vaporizes near the affected cell. Using a compressible material also helps to keep the spacer(s) in position. The degree of desired compressibility depends, in part, on the rigidity of the cell mounting brackets since the more inflexible the cells are to movement, the more important it is to use a compressible spacer so that it can be properly located between the cells. It will be appreciated that there are a large number of flexible materials that can be used for spacers 305-307, such materials exhibiting a high melting temperature, low thermal conductivity, electrically insulating and sufficient compressibility. Exemplary materials include alumina-based cloths and felts, aramid paper (e.g., Nomex® aramid paper), and fiberglass cloth that is preferably coated with silicone, acrylic, vermiculite, graphite or polytetrafluoroethylene (PTFE).

Figure 4:
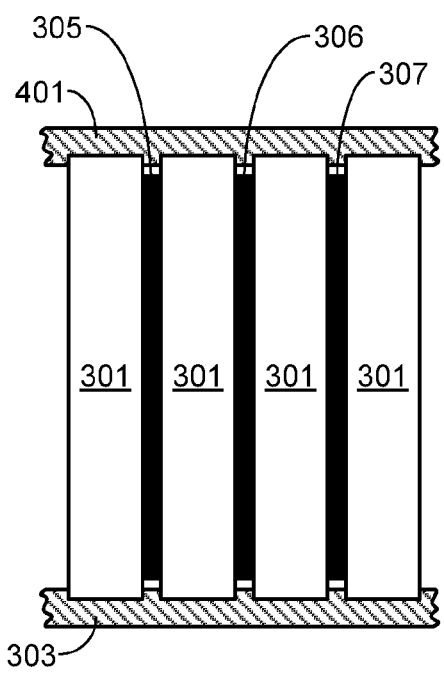
FIG. 4 is a cross-sectional view of the embodiment shown in FIG. 3.

Since spacers 305-307 are not intended to act as a thermal shield between cells, but are instead intended to keep the cells in place during thermal runaway, it is unnecessary for the spacers to run the full length of the cells, i.e., from lower bracket 303 to upper bracket 401 as illustrated in the cross-sectional view of FIG. 4 (taken along plane A-A of FIG. 3). Accordingly in order to save mass, preferably each spacer is comprised of a pair of much smaller spacers, i.e., an upper spacer and a lower spacer. For example, in the cross-sectional view of FIG. 5, spacer 305 is replaced by an upper spacer 505A and a lower spacer 505B. Similarly, spacer 306 is replaced by an upper spacer 506A and a lower spacer 506B, and spacer 307 is replaced by an upper spacer 507A and a lower spacer 507B. Although a single spacer may be used, for example one located near the top, bottom, or middle of the cells, the use of a single spacer is not preferred as it still permits limited cell movement. For example, if a single spacer is located near the top of the cells, during a thermal runaway event the lower portion of the affected cell may still move, allowing a portion of the affected cell to contact an adjacent cell, potentially leading to propagation of the thermal event.

Figure 5:
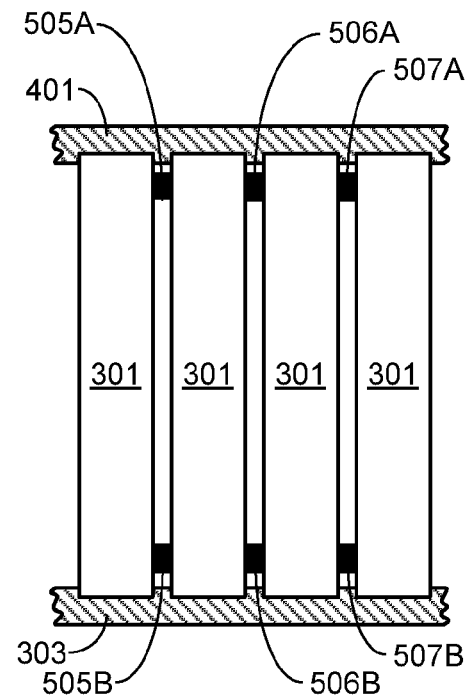
FIG. 5 is a cross-sectional view of an alternate spacer strip design for use with the embodiment shown in FIG. 3.
Figure 6:
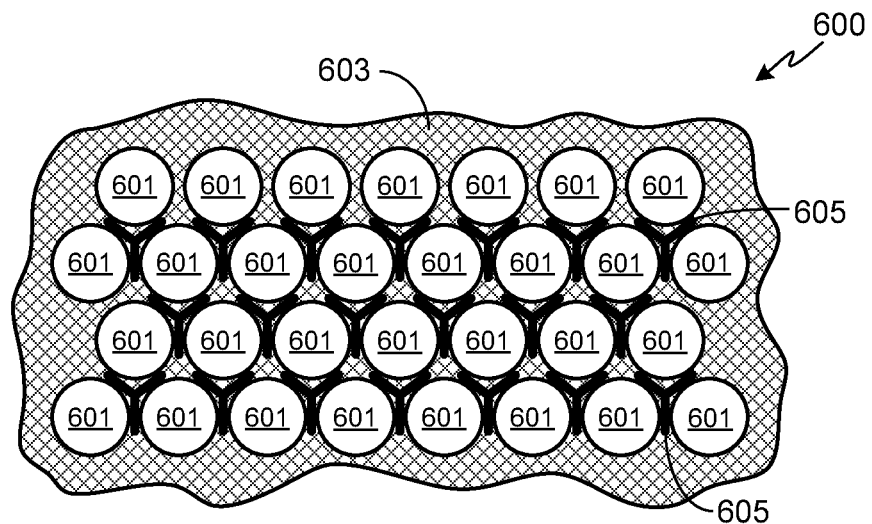
FIG. 6 provides a top view of an alternate preferred embodiment utilizing rigid spacers.

FIG. 6 provides a top-view of a portion of a battery pack 600. As with the embodiment illustrated in FIG. 3, this view shows a plurality of cylindrical cells 601 and at least a portion of a lower cell mounting bracket 603. In this embodiment, instead of weaving a compressible spacer between adjacent cells, independent rigid spacers 605 are positioned between adjacent cells. It will be appreciated that the exact shape of the spacers in this embodiment will depend upon the shape and mounting configuration for the cells, and that the design shown in FIG. 6 is merely illustrative of the approach. Preferably spacers 605 have a relatively low profile, i.e., instead of running the full length of the cells, they only cover a small region of the cell in a manner similar to that illustrated in FIG. 5 for the compressible spacer. In one exemplary configuration, the height (i.e., profile) of the spacers is only 1-5% of the overall height of cells 601. As with the prior embodiment, preferably a pair of rigid spacers 605 is used between adjacent cells, rather than a single low-profile spacer (i.e., an upper spacer and a lower spacer as illustrated in FIG. 5 relative to the compressible spacer).

Spacers 605 may be friction fit in place, or bonded in place using an adhesive or potting compound. Spacers 605 may be inserted between the cells after the cells have been positioned within lower bracket 603, or during cell mounting. Spacers 605 may be molded, die cut, machined, vacuum-formed, glass-filled, injection molded or otherwise fabricated. Spacers 605 can be formed from a semi-compressible or non-compressible material. As with the prior embodiment, a high melting temperature, low thermal conductivity, electrically insulative material is required, such as a ceramic (e.g., alumina ceramic, glass ceramic, silica ceramic, alumina silicate ceramic, etc.).

Figure 7:
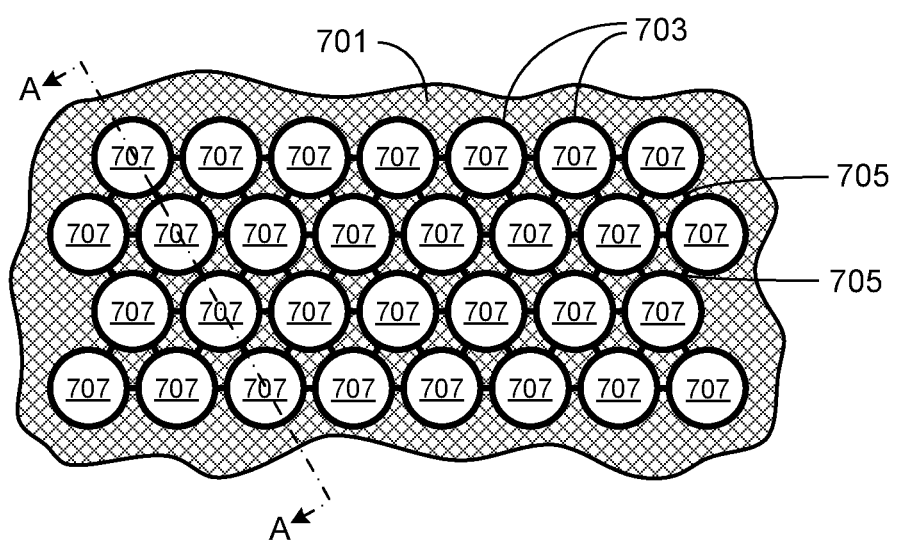
FIG. 7 provides a top view of an alternate preferred embodiment utilizing spacers integrated within the cell mounting bracket.
Figure 8:
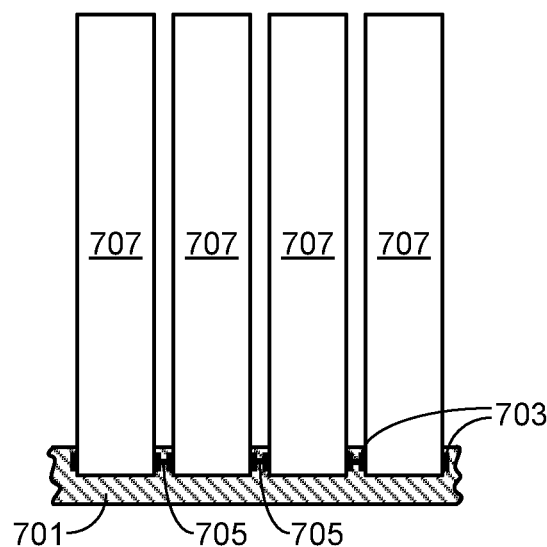
FIG. 8 is a cross-sectional view of a portion of the cell mounting bracket shown in FIG. 7.
Figure 9:
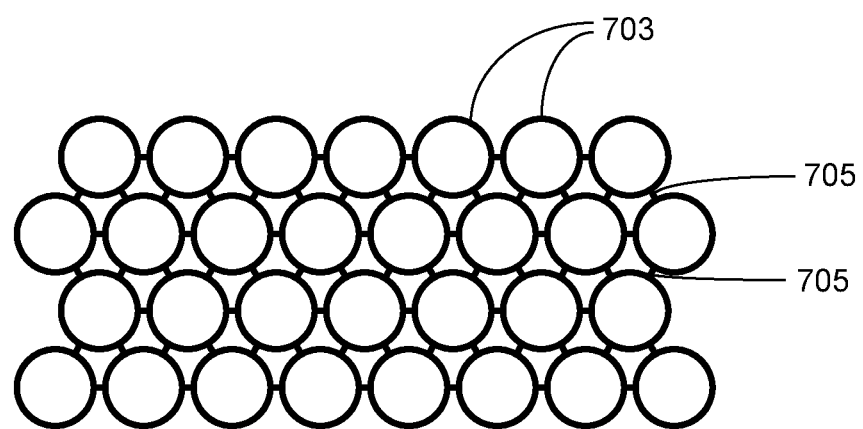
FIG. 9 provides a top view of the spacer assembly of FIG. 7 without inclusion of the cell mounting bracket.

FIGS. 7-9 illustrate an alternate preferred embodiment in which the spacers are integrated within the cell mounting brackets. In the top view of FIG. 7, a portion of a lower cell mounting bracket 701 is shown. Integral to bracket 701 is a high temperature spacer assembly. In this embodiment the spacer assembly is comprised of a plurality of battery sleeves 703 that are separated by posts 705. Batteries 707 fit within sleeves 703. FIG. 8 provides a cross-sectional view of a portion of this embodiment taken along plane A-A of FIG. 7, while FIG. 9 provides a top view of the spacer assembly without bracket 701 and cells 707, this figure showing the same portion of the assembly as previously shown in FIG. 7.

Figure 10:
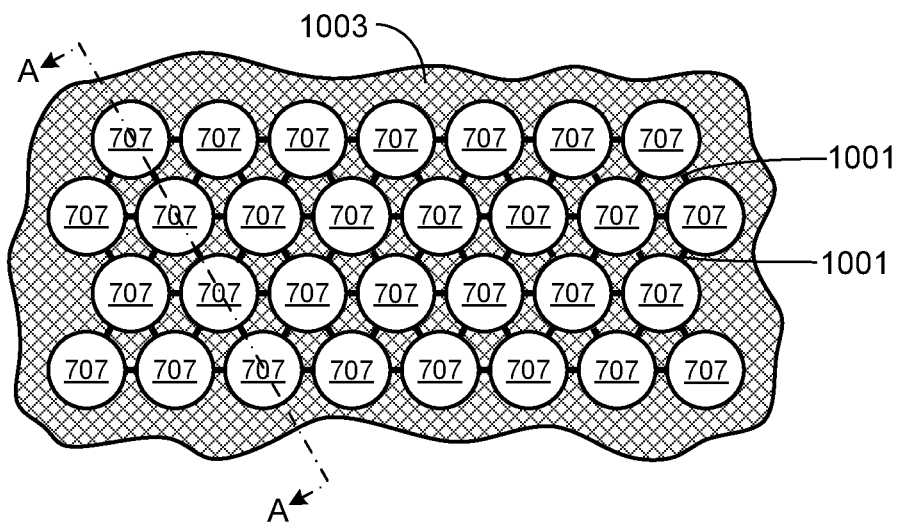
FIG. 10 provides a top view of a modification of the embodiment shown in FIG. 7 in which the spacer assembly does not utilize cell sleeves.
Figure 11:
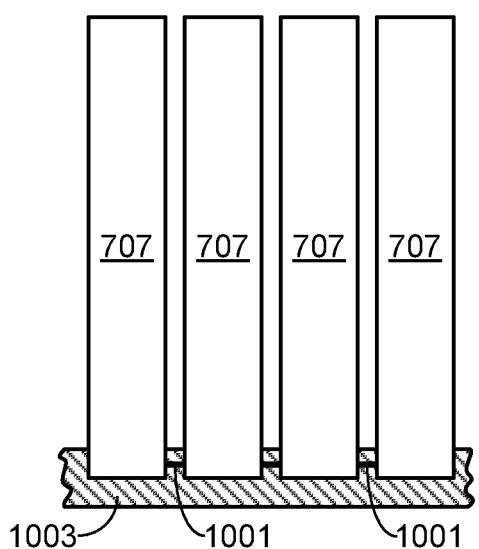
FIG. 11 is a cross-sectional view of a portion of the cell mounting bracket taken along plane A-A of FIG. 10.
Figure 12:
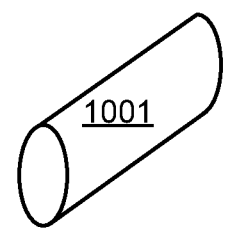
FIG. 12 is a perspective view of one of the spacers shown in FIGS. 10 and 11.
Figure 13:
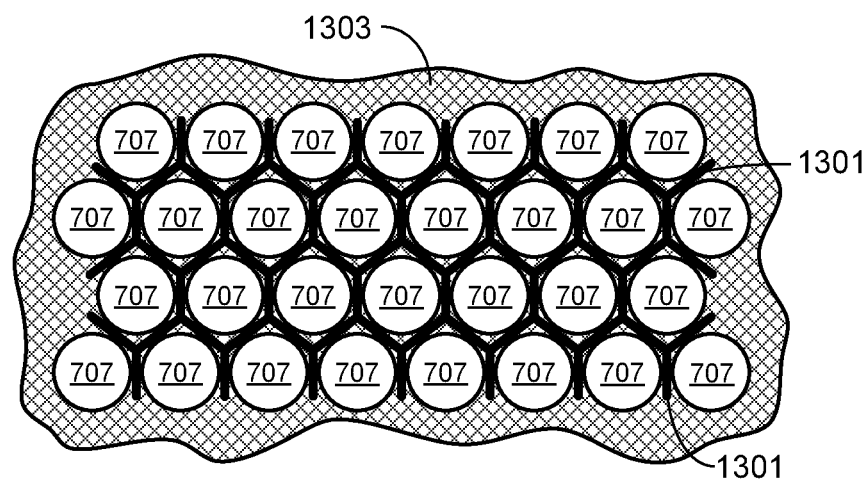
FIG. 13 is a top view of a modification of the embodiment shown in FIG. 7 in which the spacers are similar to those shown in FIG. 6.

It will be appreciated that the sleeve and post configuration shown in FIGS. 7-9 is but one possible variation of a spacer assembly that is integrated within a cell mounting bracket. For example, FIGS. 10-12 illustrate a variation of this configuration in which the spacer assembly is comprised solely of cell separation posts 1001 that are integrated within the cell mounting bracket 1003. FIG. 13 illustrates another variation of this configuration in which a spacer 1301, similar to spacer 605 of FIG. 6, is integrated within cell mounting bracket 1303. Note that due to its integration within the cell mounting bracket, spacer 1301 may be designed with less strength and mass than spacer 605 while still achieving the goals of the invention.

In general, the spacer assembly selected for integration within the cell mounting bracket depends on the type and shape of the cells employed within the battery pack as well as the intended spacer and bracket manufacturing processes. For example, in one manufacturing process, the spacer assembly is first fabricated and then the bracket is molded around the spacer assembly. In an alternate manufacturing process, the bracket is formed, after which the spacer assembly is inserted within the bracket either prior to, or during, cell mounting.

In the embodiments illustrated in FIGS. 3-6, the spacer assembly must have sufficient structural integrity and strength to withstand routine handling during assembly and use. Accordingly, an advantage of integrating the spacer assembly into the cell mounting bracket as illustrated in FIGS. 7-13 is that the spacer assembly, alone, need have only minimal structural integrity. As a consequence, the spacer assembly can be quite small, adding little mass to the mounting bracket and thus little additional mass to the battery pack. As with the previous embodiment, the spacers may be molded, machined, stamped, vacuum-formed, or otherwise fabricated from a high melting temperature, low thermal conductivity, electrically insulative material, e.g., a ceramic such as alumina ceramic, glass ceramic, silica ceramic, alumina silicate ceramic, etc.

Figure 14:
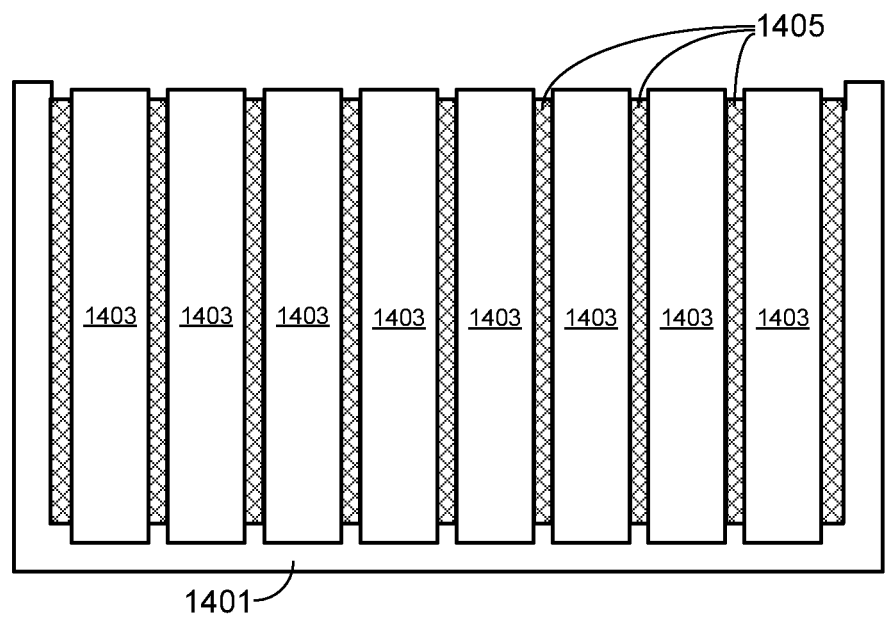
FIG. 14 provides a cross-sectional view of view of a battery pack using a loose fill spacer material.

In another embodiment, loose fill spacer material is used to keep the cells in place during thermal runaway, thereby minimizing the risk of thermal runaway propagation. FIG. 14 is a cross-sectional view of a mounting bracket 1401, a plurality of cells 1403, and loose fill spacer material 1405 packed between the cells. In order to ensure that sufficient loose fill material is added to the battery pack to prevent migration of the material from one location to another, thereby decreasing the effectiveness of the spacer material, preferably the battery pack is completely filled with the loose fill spacer material. Accordingly it is necessary to locate the cells within the pack and add any additional battery pack components such as the cell interconnect assembly and a cell cooling system, if used, prior to filling the enclosure with the loose fill spacer material.

In the embodiment illustrated in FIG. 14, mounting bracket 1401 not only provides the cell mounting structure, but also the battery pack housing wall. It will be appreciated that bracket 1401 may be comprised of multiple pieces without departing from the invention, for example using a cell mounting structure that forms an interior portion of the battery pack housing. The exact configuration depends on the number and type of cells, the intended application of the battery pack, the means used to interconnect the cells, the design of any integral cooling system, etc.

Due to the relatively close cell packing used in most battery packs, it is important to force the loose fill spacer material between the cells, thus preventing cell movement during thermal runaway. Accordingly, in a preferred embodiment an injection manifold is used that includes a plurality of injection ports, the injection ports positioned relative to the inter-cell spacing such that the loose fill material 1405 is forced between all of the cells 1403. Given that loose fill spacer material 1405 is forced between the cells, it should be appreciated that not only will material 1405 prevent cell movement during thermal runaway, but it will also help to thermally isolate the affected cell by minimizing the transfer of thermal energy via convection and radiation.

As with the prior embodiments, loose fill spacer material 1405 may be comprised of any material that has a high enough melting temperature to prevent cell movement during thermal runaway. Additionally, and as previously noted, preferably the material is also electrically insulating and has a low thermal conductivity. Typical materials used for loose fill spacer 1405 include any of a variety of different ceramics, e.g., alumina ceramic fibers, glass ceramic fibers, silica ceramic fibers, alumina silicate ceramic fibers, etc.

Although the cells in the illustrated embodiments have a cylindrical form, e.g., an 18650 form-factor, as previously noted the invention may be used with other cell designs, shapes and configurations. Additionally, the invention is not limited to a battery pack with a specific number of cells or a specific cell interconnect arrangement.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A thermal runaway propagation prevention system for use with a plurality of batteries contained within a battery pack, the thermal runaway propagation prevention system comprising:
   a cell mounting bracket configured to hold at least a portion of each of said plurality of batteries within a predetermined location and with a minimum battery-to-battery separation distance, wherein said cell mounting bracket is fabricated from a first material with a first melting temperature; and
   a spacer assembly comprised of a plurality of rigid spacers independent and separate from said cell mounting bracket, said plurality of rigid spacers configured to fit between adjacent batteries of said plurality of batteries and maintain each of said plurality of batteries within said predetermined location and with said minimum battery-to-battery separation distance, wherein each of said plurality of rigid spacers has a height dimension between 1 and 5% of the overall height of each of said plurality of batteries, wherein each of said plurality of rigid spacers is comprised of a second material with a second melting temperature, wherein said second melting temperature is greater than said first melting temperature, wherein said second material is comprised of a ceramic material, and wherein said ceramic material is electrically insulating and has a low coefficient of thermal conductivity.

2. The thermal runaway propagation prevention system of claim 1, wherein said second melting temperature is greater than 300° C.

3. The thermal runaway propagation prevention system of claim 1, wherein said second melting temperature is greater than 500° C.

4. The thermal runaway propagation prevention system of claim 1, wherein said second melting temperature is greater than 800° C.

5. The thermal runaway propagation prevention system of claim 1, wherein said second melting temperature is greater than 1000° C.

6. The thermal runaway propagation prevention system of claim 1, wherein said second material is selected from the group consisting of aluminum oxide, magnesium oxide, silicon dioxide, silicon nitride, silicon carbide, alumina silicate, aramid paper, silicone coated fiberglass, acrylic coated fiberglass, vermiculite coated fiberglass, graphite coated fiberglass, polytetrafluoroethylene coated fiberglass, or some combination thereof.

7. The thermal runaway propagation prevention system of claim 1, wherein said plurality of rigid spacers are friction fit between adjacent batteries of said plurality of batteries.

8. The thermal runaway propagation prevention system of claim 1, wherein said plurality of rigid spacers are bonded in place.

* * * * *